United States Patent
Lo et al.

(10) Patent No.: US 10,423,028 B2
(45) Date of Patent: *Sep. 24, 2019

(54) DISPLAY APPARATUS

(71) Applicant: E Ink Holdings Inc., Hsinchu (TW)

(72) Inventors: Po-Yuan Lo, Hsinchu (TW); Tai-Yuan Lee, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/908,834

(22) Filed: Mar. 1, 2018

(65) Prior Publication Data

US 2018/0188596 A1    Jul. 5, 2018

Related U.S. Application Data

(63) Continuation-in-part of application No. 14/692,700, filed on Apr. 21, 2015, now Pat. No. 9,964,830.

(30) Foreign Application Priority Data

Apr. 22, 2014  (TW) .................... 103114510
Apr. 17, 2015  (TW) .................... 104112413

(51) Int. Cl.
*G02F 1/167* (2019.01)
*G02F 1/1335* (2006.01)
*G02B 27/22* (2018.01)
*G02F 1/1368* (2006.01)
(Continued)

(52) U.S. Cl.
CPC ... *G02F 1/133514* (2013.01); *G02B 27/2214* (2013.01); *G02F 1/1368* (2013.01);
(Continued)

(58) Field of Classification Search
CPC .............. G02B 27/2214; G02F 1/13306; G02F 1/133345; G02F 1/1368; G02F 2201/123;
(Continued)

(56) References Cited

U.S. PATENT DOCUMENTS

2004/0263947 A1    12/2004   Drzaic et al.
2008/0272987 A1*   11/2008   Lee ................... G02F 1/167
                                                    345/55

(Continued)

FOREIGN PATENT DOCUMENTS

CN    201069507    6/2008
CN    101324732    12/2008
(Continued)

OTHER PUBLICATIONS

"Office Action of China Counterpart Application", dated Apr. 10, 2018, p. 1-p. 9, in which the listed references were cited.

Primary Examiner — Richard J Hong
(74) Attorney, Agent, or Firm — JCIPRNET

(57) ABSTRACT

A display apparatus includes a first substrate, a plurality of sub-pixel structures, a color filter array, and a display layer. The sub-pixel structures are disposed on the first substrate, and each of the sub-pixel structures includes at least two sub-pixel sub-structures. The color filter array is disposed above the sub-pixel structures, and includes a plurality of filter units. The filter units are divided into a plurality of groups having different colors, and the filter units belonging to the groups having different colors are alternately disposed above the sub-pixel structures. Each of the filter units corresponds to the at least two sub-pixel sub-structures of at least one sub-pixel structure, and the at least two sub-pixel sub-structures of the same sub-pixel structure are adapted to be applied different voltages. The display layer is disposed on the sub-pixel structures.

4 Claims, 8 Drawing Sheets

(51) Int. Cl.
*G02F 1/133* (2006.01)
*G02F 1/1333* (2006.01)
*G02F 1/1343* (2006.01)

(52) U.S. Cl.
CPC .... *G02F 1/13306* (2013.01); *G02F 1/133345* (2013.01); *G02F 1/133526* (2013.01); *G02F 1/134309* (2013.01); *G02F 1/167* (2013.01); *G02F 2001/133607* (2013.01); *G02F 2001/133616* (2013.01); *G02F 2001/134345* (2013.01); *G02F 2201/123* (2013.01); *G02F 2201/52* (2013.01)

(58) Field of Classification Search
CPC ......... G02F 1/133514; G02F 1/134309; G02F 1/167; G02F 2001/134345; G02F 2201/52; G02F 1/133526; G02F 2001/133607; G02F 2001/133616
See application file for complete search history.

(56) References Cited

U.S. PATENT DOCUMENTS

| | | | |
|---|---|---|---|
| 2009/0109172 A1 | 4/2009 | Lee et al. | |
| 2009/0168167 A1* | 7/2009 | Hiroya | G02B 27/2214 359/477 |
| 2010/0157411 A1 | 6/2010 | Kwon et al. | |
| 2011/0096156 A1 | 4/2011 | Kim et al. | |
| 2012/0026209 A1 | 2/2012 | Wang et al. | |
| 2012/0032949 A1 | 2/2012 | Lim et al. | |
| 2012/0081643 A1 | 4/2012 | Yaguchi et al. | |
| 2014/0063378 A1 | 3/2014 | Sumi et al. | |
| 2014/0063601 A1* | 3/2014 | Qu | G02B 27/2214 359/463 |
| 2014/0133023 A1 | 5/2014 | Park et al. | |
| 2014/0160395 A1* | 6/2014 | Park | G02B 27/2214 349/61 |
| 2014/0240475 A1* | 8/2014 | Shigemura | G02B 27/2214 348/59 |
| 2015/0241710 A1* | 8/2015 | Chen | G02B 27/2214 349/15 |
| 2015/0293365 A1 | 10/2015 | Van Putten et al. | |

FOREIGN PATENT DOCUMENTS

| | | |
|---|---|---|
| CN | 101806983 | 8/2010 |
| CN | 102193239 | 9/2011 |
| CN | 102376242 | 3/2012 |
| JP | 2005250167 | 9/2005 |
| TW | 200638063 | 11/2006 |

* cited by examiner

DISPLAY APPARATUS

CROSS-REFERENCE TO RELATED APPLICATION

This application is a continuation-in-part (CIP) application of and claims the priority benefit of U.S. application Ser. No. 14/692,700, filed on Apr. 21, 2015, now allowed, which claims the priority benefit of Taiwan application serial no. 103114510, filed on Apr. 22, 2014 and Taiwan application serial no. 104112413 filed on Apr. 17, 2015. The entirety of each of the above-mentioned patent applications is hereby incorporated by reference herein and made a part of this specification.

FIELD OF THE INVENTION

The invention relates to a display apparatus.

DESCRIPTION OF RELATED ART

With the advances in display technology and image processing technology, images displayed on the display becomes more and more photorealistic. For example, as far as a two-dimensional (2D) image displayed on the display is concerned, characters/objects in three-dimensional (3D) animations or in synthetic films thereof are displayed with rich variations in shadows or abundant gradations in lights, and therefore, even if characters and objects are presented in a two-dimensional (2D) image mode, a user may still see three-dimensional (3D) effects in these characters and objects.

However, a conventional sub-pixel of a display is usually only presented in a gray scale, and therefore the displayed image has only one color level. In this case, three-dimensional (3D) effects of the image would not be leavened by enhancing variations in shadows or gradations in lights.

Three-dimensional (3D) display technology used for presenting three-dimensional (3D) images has been applied to display apparatus which is used by the general public, and is no longer limited for cinemas. 3D display technology can be divided into glasses type 3D display technology and non-glasses type 3D display technology. In glasses type 3D display technology, different optical films or optical structures on left and right lens are employed for a left eye to receive a left-eye image on a display while a right eye receives a right-eye image on the display, where the left-eye image and the right-eye image are images having view angle differences. Thus, a user's brain is capable of interpret these images into three-dimensional (3D) images.

In non-glasses type 3D display technology, frames having different view angles are transmitted toward different directions. Therefore, when a user is present in a particular location, the left and right eyes will see images with different view angles, thereby enabling the brain to interpret these two images with different view angles into a three-dimensional (3D) image.

Three-dimensional (3D) display technology may further be classified into time multiplexing technology and spatial multiplexing technology, in which time multiplexing technology allows images with different view angles to appear alternately and rapidly at different times. However, such technology does not work well with an electrophoretic display having slower refresh rates. In addition, the conventional spatial multiplexing technology divides display pixels into left-eye pixels and right eye pixels, such that image resolution is reduced by half, and numbers of pixels are insufficient for presenting images in various color levels. Thus, contents of three-dimensional images are not rich enough.

SUMMARY OF THE INVENTION

The invention provides a display apparatus, which is capable of enhancing three-dimensional (3D) effects of an image or is configured for presenting rich three-dimensional (3D) images.

A display apparatus according to an embodiment of the invention includes a first substrate, a plurality of sub-pixel structures, a color filter array, a display layer, and an image divider. The sub-pixel structures are disposed on the first substrate, and each of the sub-pixel structures includes at least two sub-pixel sub-structures. The color filter array is disposed above the sub-pixel structures, and includes a plurality of filter units. These filter units are divided into a plurality of groups having different colors, and the filter units belonging to the groups having different colors are alternately disposed above the sub-pixel structures along an arrangement direction. Each of the filter units corresponds to the at least two sub-pixel sub-structures of at least one sub-pixel structure, and the at least two sub-pixel sub-structures of the same sub-pixel structure are applied different voltages. The display layer is disposed on the sub-pixel structures. The image divider is disposed above the display layer, and configured to guide lights from the different sub-pixel sub-structures of the same sub-pixel structure toward different directions, such that the display apparatus displays a three-dimensional image. The image divider is a lenticular film comprising a plurality of lenticulars arranged along the arrangement direction, and a pitch of the lenticulars in the arrangement direction is substantially the same as a total width of filter units having different colors in a single color alternating period.

In an embodiment of the invention, each of the sub-pixel sub-structures includes a transistor and a pixel electrode, wherein the pixel electrode is electrically connected to the transistor.

In an embodiment of the invention, the display apparatus further includes a control unit electrically connected to the sub-pixel sub-structures, and is configured for the different sub-pixel sub-structures of the sub-pixel structures to be driven respectively to voltages corresponding to images in different color levels, so as to enhance three-dimensional (3D) effects of the images displayed by the display apparatus.

In an embodiment of the invention, the display apparatus further includes a control unit electrically connected to the sub-pixel sub-structures, and is configured for the different sub-pixel sub-structures of the sub-pixel structures to be driven respectively to voltages corresponding to images of different view angles, such that the display apparatus displays a three-dimensional (3D) image.

In an embodiment of the invention, the display apparatus further includes a second substrate and a transparent conductive layer. The display layer is disposed between the sub-pixel structures and the second substrate, and the color filter array is disposed below the second substrate. The transparent conductive layer is disposed below the second substrate, and is located between the second substrate and the display layer.

In an embodiment of the invention, the sub-pixel sub-structures of each of the sub-pixel structures are arranged in a two-dimensional (2D) may.

In an embodiment of the invention, the sub-pixel substructures of each of the sub-pixel structures are arranged in a line.

In an embodiment of the invention, the filter units are colored photoresist.

A display apparatus according to an embodiment of the invention includes a first substrate, a plurality of sub-pixel structures, a color filter array, and a display layer. The sub-pixel structures are disposed on the first substrate, and each of the sub-pixel structures includes at least two sub-pixel sub-structures. The color filter array is disposed above the sub-pixel structures, and includes a plurality of filter units. These filter units are divided into a plurality of groups having different colors, and the filter units belonging to the groups having different colors are alternately disposed above the sub-pixel structures along an arrangement direction. Each of the filter units corresponds to the at least two sub-pixel sub-structures of at least one sub-pixel structure, and the at least two sub-pixel sub-structures of the same sub-pixel structure are applied different voltages. The filter units are in cylindrical lenticular shapes, and the filter units are configured to guide lights from the different sub-pixel sub-structures of the same sub-pixel structure toward different directions, such that the display apparatus displays a three-dimensional image. A pitch of the filter units in the arrangement direction of the filter units is substantially the same as a pitch of the sub-pixel structures in the arrangement direction. The display layer is disposed on the sub-pixel structures.

In an embodiment of the invention, the display apparatus further includes a passivation layer covering the filter units.

In an embodiment of the invention, each of the filter units is complied with R/4<H<2R, wherein H is a height for the filter unit in a direction perpendicular to the first substrate, and R is a width for the filter unit in a direction parallel to the first substrate.

In an embodiment of the invention, each of the filter units extends in a first direction, and the filter units are arranged in a second direction.

A display apparatus according to an embodiment of the invention includes a first substrate, a plurality of sub-pixel structures, a display layer, and an image divider. The sub-pixel structures are disposed on the first substrate, and each of the sub-pixel structures includes at least two sub-pixel sub-structures. The display layer is disposed above the sub-pixel structures, and includes a plurality of display units. These display units are divided into a plurality of groups having different colors, and the display units belonging to the groups having different colors are alternately disposed above the sub-pixel structures along an arrangement direction. Each of the display units corresponds to the at least two sub-pixel sub-structures of at least one sub-pixel structure, and the at least two sub-pixel sub-structures of the same sub-pixel structure are applied different voltages. The image divider is disposed above the display layer, and configured to guide lights from the different sub-pixel sub-structures of the same sub-pixel structure toward different directions, such that the display apparatus displays a three-dimensional image. The image divider is a lenticular film comprising a plurality of lenticulars arranged along the arrangement direction.

In an embodiment of the invention, a pitch of the lenticulars in the arrangement direction is substantially the same as a total width of display units having different colors in a single color alternating period.

In an embodiment of the invention, the display layer includes a plurality of capsules, a plurality of electrophoretic particles and a medium. The electrophoretic particles are disposed in the capsules, the medium is filled in the capsules, wherein colors of the electrophoretic particles in the display units having different colors are at least partially different.

In the display apparatus of the embodiments of the invention, due to that at least one sub-pixel structure in correspondence with a filter unit or a display unit is divided into a plurality of sub-pixel sub-structures, the sub-pixel sub-structures may be configured for displaying images in different color levels or of different view angles, so as to enhance a three-dimensional (3D) sense of an image displayed by the display apparatus, or to form a three-dimensional (3D) image rich in content.

Several exemplary embodiments accompanied with figures are described in detail below to further describe the invention in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1A:
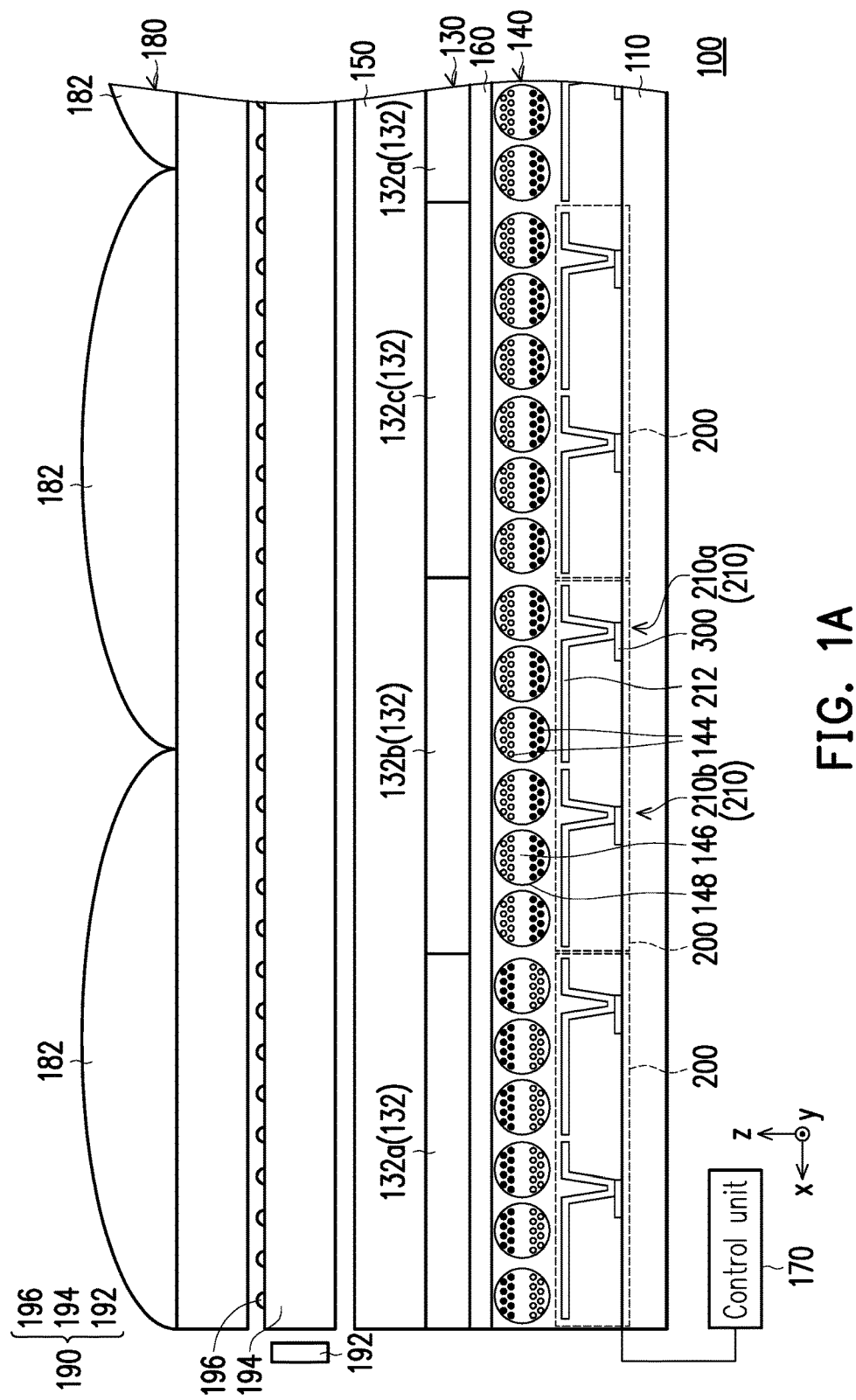
FIG. 1A is a schematic cross-sectional view illustrating a display apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
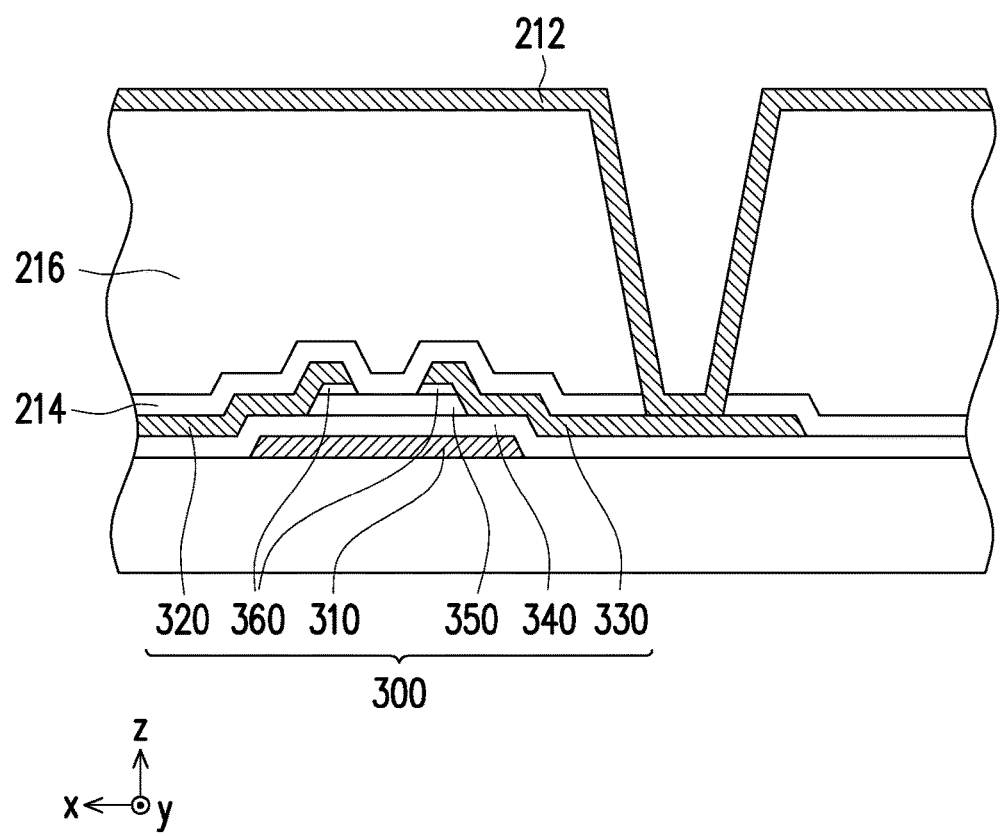
FIG. 1B is a schematic cross-sectional view illustrating one sub-pixel sub-structure in FIG. 1A.
Figure 1C:
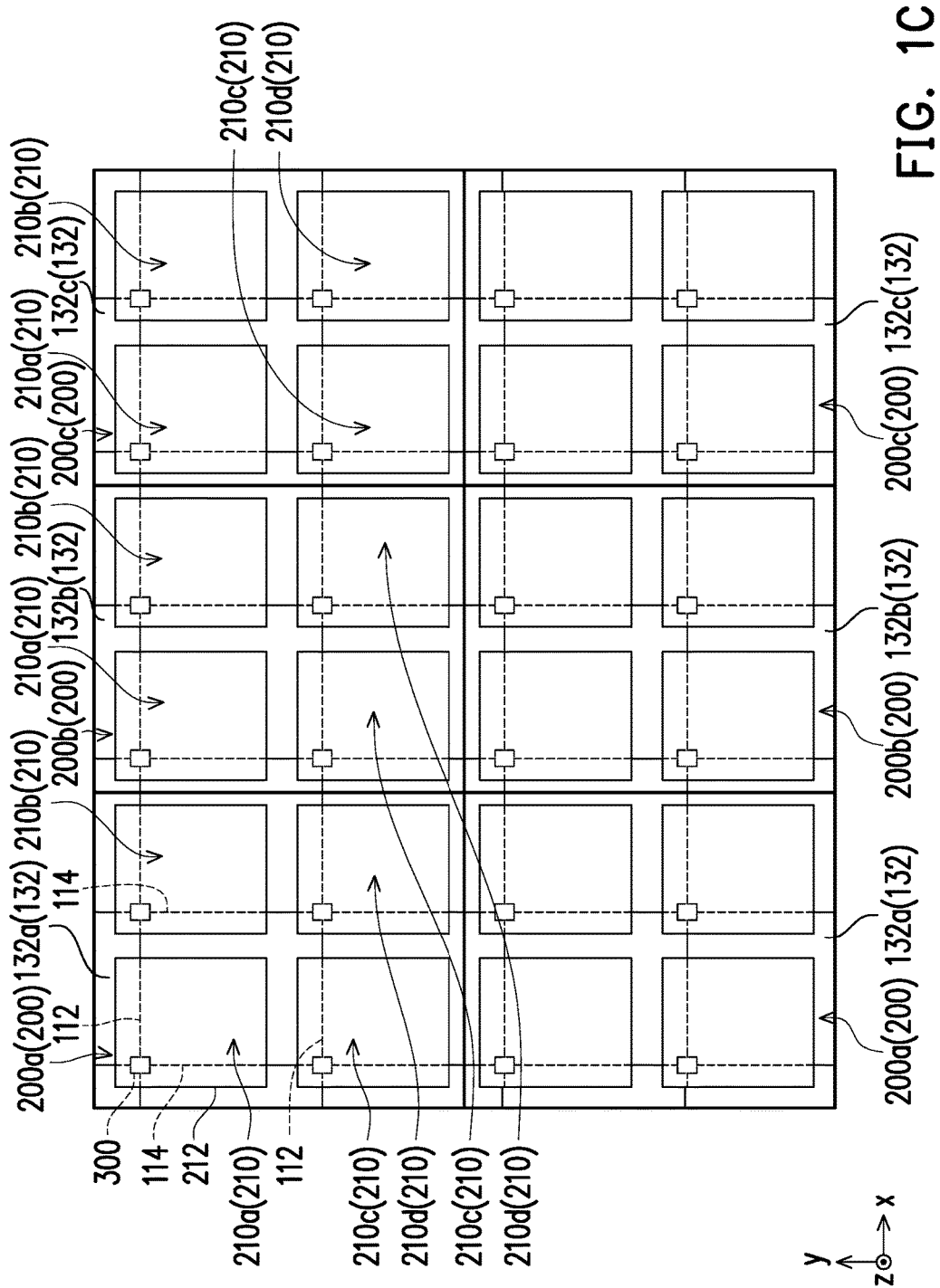
FIG. 1C is a partial top view illustrating a sub-pixel structure and a color filter array in FIG. 1A.

FIG. 1A is a schematic cross-sectional view illustrating a display apparatus according to an embodiment of the invention. FIG. 1B is a schematic cross-sectional view illustrating one sub-pixel sub-structure in FIG. 1A, and FIG. 1C is a partial top view illustrating a sub-pixel structure and a color filter array in FIG. 1A. With reference to FIG. 1A to FIG. 1C, a display apparatus 100 of the present embodiment includes a first substrate 110, a plurality of sub-pixel structures 200, a color filter array 130, and a display layer 140. The sub-pixel structures 200 are disposed on the first substrate 110. The first substrate 110 of the present embodiment is a glass substrate. However, in other embodiments, the first substrate 110 may also be a plastic substrate, a silicon substrate, a printed circuit board (PCB), a flexible substrate, or other appropriate substrate materials.

Each of the sub-pixel structures 200 includes at least two sub-pixel sub-structures 210. In the present embodiment, each of the sub-pixel sub-structures 210 includes a transistor 300 and a pixel electrode 212, wherein the pixel electrode 212 is electrically connected to the transistor 300. Specifically, as illustrated in FIG. 1B, the transistor 300 of the present embodiment may include a gate 310, a source 320, a drain 330, a gate insulating layer 340, a channel layer 350, and two ohmic contact layers 360. The gate insulating layer 340 divides the gate 310 and the channel layer 350. The source 320 is electrically connected to one end of the channel layer 350, while the drain 330 is electrically connected to another end of the channel layer 350. In addition, one of the ohmic contact layers 360 may connect the source 320 and the channel layer 350 to reduce contact resistance between the source 320 and the channel layer 350, while the other ohmic contact layer 360 may connect the drain 330 and the channel layer 350 to reduce contact resistance between the drain 330 and the channel layer 350 to reduce contact resistance between the drain 330 and the channel layer 350. In the present embodiment, the channel layer 350 is a semiconductor layer, and the transistor 300 is a thin film transistor (TFT). In addition, the passivation layer 214 covers the transistor 300, and the flattening layer 216 covers the passivation layer 214. A portion of the pixel electrode 212 is disposed on the flattening layer 216, while another portion of the pixel electrode 212 is connected to the drain 330 by penetrating through the flattening layer 216 and the passivation layer 214.

The color filter array 130 is disposed above the sub-pixel structures 200, and includes a plurality of filter units 132 (a plurality of filter units 132a, a plurality of filter units 132b, and a plurality of filter units 132c are taken as examples in FIG. 1A). The filter units 132 are divided into a plurality of groups having different colors (i.e., three groups such as a group composed of the filter units 132a, a group composed of the filter units 132b, and a group composed of the filter unit 132c). The filter units 132a, for example, are red filter units. The filter units 132b, for example, are green filter units, and the filter units 132c, for example, are blue filter units. Furthermore, the filter units 132 of the groups having different colors are alternately disposed above the sub-pixel structures 200. For example, as illustrated in FIG. 1C, the filter units 132a, 132b, and 132c are periodically arranged in sequence along a direction (e.g., in a lateral direction as shown in FIG. 1C). However, in another embodiment, the filter units 132a, 132b, and 132c may also be periodically arranged along a lateral direction and a longitudinal direction simultaneously. The filter units 132 of the present embodiment are colored photoresist. However, in other embodiments, the filter units 132 may also be filter units formed in other forms or with other materials.

Each of the filter units 132 corresponds to the sub-pixel sub-structures 210 of at least one sub-pixel structure 200 (In the present embodiment, each of the filter units 132 corresponds to the sub-pixel sub-structures 210 of one sub-pixel structure 200, for example). For example, the filter units 132a are located right above sub-pixel sub-structures 210a, 210b, 210c, and 210d of a sub-pixel structure 200a. The filter units 132b are located right above the sub-pixel sub-structures 210a, 210b, 210c, and 210d of a sub-pixel structure 200b, and the filter units 132c are located right above the sub-pixel sub-structures 210a, 210b, 210c, and 210d of a sub-pixel structure 200c. In addition, the sub-pixel structure 200a, the sub-pixel structure 200b, and the sub-pixel structure 200c adjacent to each other form a pixel. In the present embodiment, the sub-pixel sub-structures 210 of each of the sub-pixel structures 200 are disposed in a two-dimensional (2D) array. For example, in FIG. 1C, the sub-pixel sub-structures 210 thereof are disposed in a 2×2 two-dimensional (2D) array. However, in other embodiments, the two-dimensional (2D) array may also be an M×N two-dimensional (2D) array, wherein M and N are positive integers greater than or equal to 2.

Furthermore, at least two of the sub-pixel sub-structures 210 of the same sub-pixel structure 200 are applied different voltages. Specifically, in the present embodiment, the gate 310 of the transistor 300 of each of the sub-pixel sub-structures 210 is electrically connected to a scan line 112, and the source 320 thereof is electrically connected to a data line 114. Therefore, the voltages applied to the pixel electrodes 212 of the sub-pixel sub-structures 210 of the same sub-pixel structure 200 may be respectively and independently controlled.

Additionally, the display layer 140 is disposed on the sub-pixel structures 200. The display apparatus 100 of the present embodiment further includes a second substrate 150 and a transparent conductive layer 160. The display layer 140 is disposed between the sub-pixel structures 200 and the second substrate 150, and the color filter array 130 is disposed below the second substrate 150. The transparent conductive layer 160 is disposed below the second substrate 150, and is located between the second substrate 150 and the display layer 140. The display layer 140 of the present embodiment may be an electrophoretic layer, which includes a plurality of electrophoretic particles 144 and a medium 146 forming a plurality of capsules 148. The electrophoretic particles 144 and the medium 146 fill in the capsules 148. In the present embodiment, the medium 146 is a liquid medium, such as oil, while the electrophoretic particles 144 may swim in the medium 146. In other words, the display apparatus 100 is, for example, an electrophoretic display apparatus. However, in other embodiments, the display layer 140 may be a liquid crystal layer or any other appropriate display medium layer, and the display apparatus 100 may be a liquid crystal display apparatus or any other appropriate display apparatus.

In the display apparatus 100 of the present embodiment, due to that one sub-pixel structure 200 in correspondence with one filter unit 132 is divided into the plurality of sub-pixel sub-structures 210, the sub-pixel sub-structures 210 may be configured for displaying images in different color levels to enhance a three-dimensional (3D) sense of an image displayed by the display apparatus 100. For example, the sub-pixel sub-structures 210a of all of the sub-pixel structures 200 may be configured for displaying an image of one kind of the color levels, while the sub-pixel sub-structures 210c of the sub-pixel structures 200 may be configured for displaying an image of another kind of the color levels. By superimposing images with varieties of different color levels, a user may see an image full of shadows or illuminated varieties, and feel the image full of the three-dimensional (3D) sense. In more detail, in an embodiment, the display apparatus 100 further includes a control unit 170 electrically connected to the sub-pixel sub-structures 210, and configured for the different sub-pixel sub-structures 210 of the sub-pixel structures 200 to be driven to voltages corresponding to images in different color levels (i.e., voltages of the pixel electrodes 212) so as to enhance three-dimensional (3D) effects of an image displayed by the display apparatus 100.

In the present embodiment, the display apparatus 100 further includes an image divider 180 disposed above the color filter array 130, and configured for guiding lights from the different sub-pixel sub-structures 210 of the same sub-pixel structure 200 toward different directions, such that the display apparatus 100 displays a three-dimensional (3D) image. The image divider 180 of the present embodiment is a lenticular film. However, in other embodiments, the image divider 180 may also be a parallax barrier.

In an embodiment, the control unit 170 is configured for driving the different sub-pixel sub-structures 210 of the sub-pixel structures 200 respectively to voltages corresponding to images of different view angles, such that the display apparatus 100 displays a three-dimensional (3D) image. For example, each of lenticulars 182 of the image divider 180 may extend along a y direction, and the lenticulars 182 are arranged along an x direction, wherein a z direction is substantially perpendicular to the image divider 180 (i.e., perpendicular to extending directions of the lenticular film, which is a normal direction). In addition, the x direction, y direction, and z direction are perpendicular to each other. Moreover, all of the sub-pixel sub-structures 210a of the sub-pixel structures 200 may be configured for displaying a right-eye image of one kind of the color levels. The sub-pixel sub-structures 210b of the sub-pixel structures 200 may be configured for displaying a left-eye image of the color level. The sub-pixel sub-structures 210c of the sub-pixel structures 200 may be configured for displaying the right-eye image of another kind of the color levels, while the sub-pixel sub-structures 210d of the sub-pixel structures 200 may be configured for displaying the left-eye image of the another kind of the color levels.

In brief, due to that the sub-pixel sub-structures 210a, 210c, and the sub-pixel sub-structures 210b, 210d respectively display an image in two different view angles, left and right eyes of a user may respectively see images of different view angles for a brain of the user to interpret images as three-dimensional (3D) images. On another aspect, due to that the sub-pixel sub-structures 210a, 210b display an image of one kind of the color levels and the sub-pixel sub-structures 210c, 210d display an image of another kind of the color levels, shadows or illuminated varieties of an image may be enhanced to further improve a three-dimensional (3D) sense of the image. However, in another embodiment, the display apparatus 100 may also not include the image divider 180, and the sub-pixel sub-structures 210a, the sub-pixel sub-structures 210b, the sub-pixel sub-structures 210c, and the sub-pixel sub-structures 210d respectively display an image in four different color levels, such that shadows or illuminated varieties of the image may further be enhanced to improve a three-dimensional (3D) sense of the image. When each of the sub-pixel structures 200 includes M×N sub-pixel sub-structures 210 arranged in M×N arrays, the sub-pixel sub-structures 210 may respectively display an image in M×N kinds of the color levels, wherein M and N, for example, are positive integers greater than or equal to 2. Alternatively, in another embodiment, the sub-pixel sub-structures 210 of each of the sub-pixel structures 200 are disposed in a line (e.g., arranged along the x direction), and respectively display an image in various kinds of different view angles. For example, the sub-pixel structure 200 may also include the sub-pixel sub-structures 210a and 210b, but not include the sub-pixel sub-structures 210c and 210d. Furthermore, the sub-pixel sub-structures 210a and 210b are configured for displaying a right-eye image and a left-eye image, respectively.

The display apparatus 100 of the present embodiment further includes a front-light module 190 disposed above the second substrate 150. The front-light module 190 may include a light source 192 and a light guide plate 194, wherein the light source 192 is disposed on a side of the light guide plate 194, and one of an upper surface and a lower surface of the light guide plate 194 is provided with a plurality of light scattering microstructures 196. The light scattering microstructures 196 scatter lights transmitted in the light guide plate 194 toward the second substrate 150 so as to provide surface light source to the electrophoretic particles 144. The electrophoretic particles 144 create grayscale effects by reflecting lights or absorbing lights. However, in other embodiments, the display apparatus 100 may also not include the front-light module 190. Rather, an external ambient light is used to be a light source for the electrophoretic particles 144.

Figure 2A:
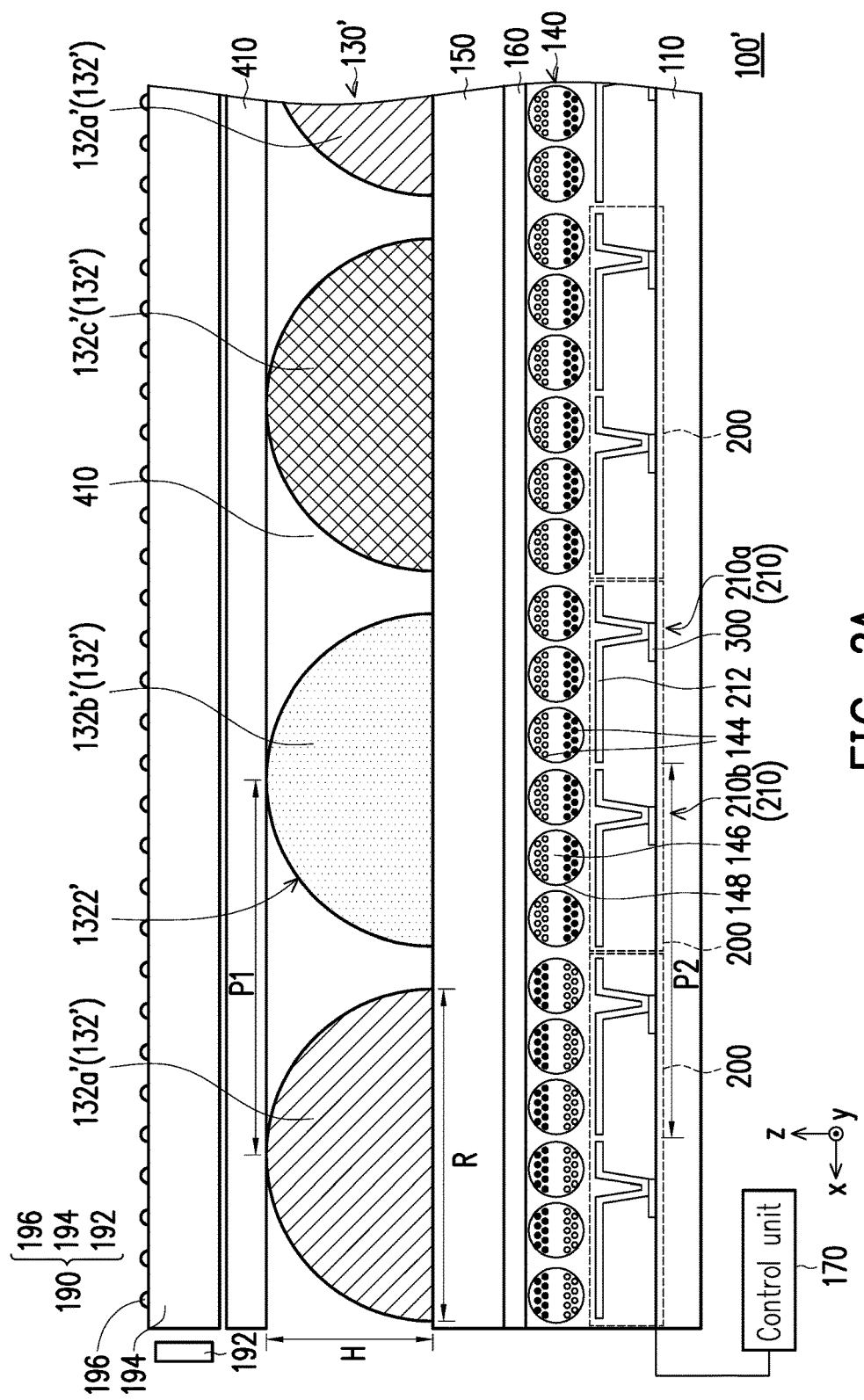
FIG. 2A is a schematic cross-sectional view illustrating a display apparatus according to another embodiment of the invention.
Figure 2B:
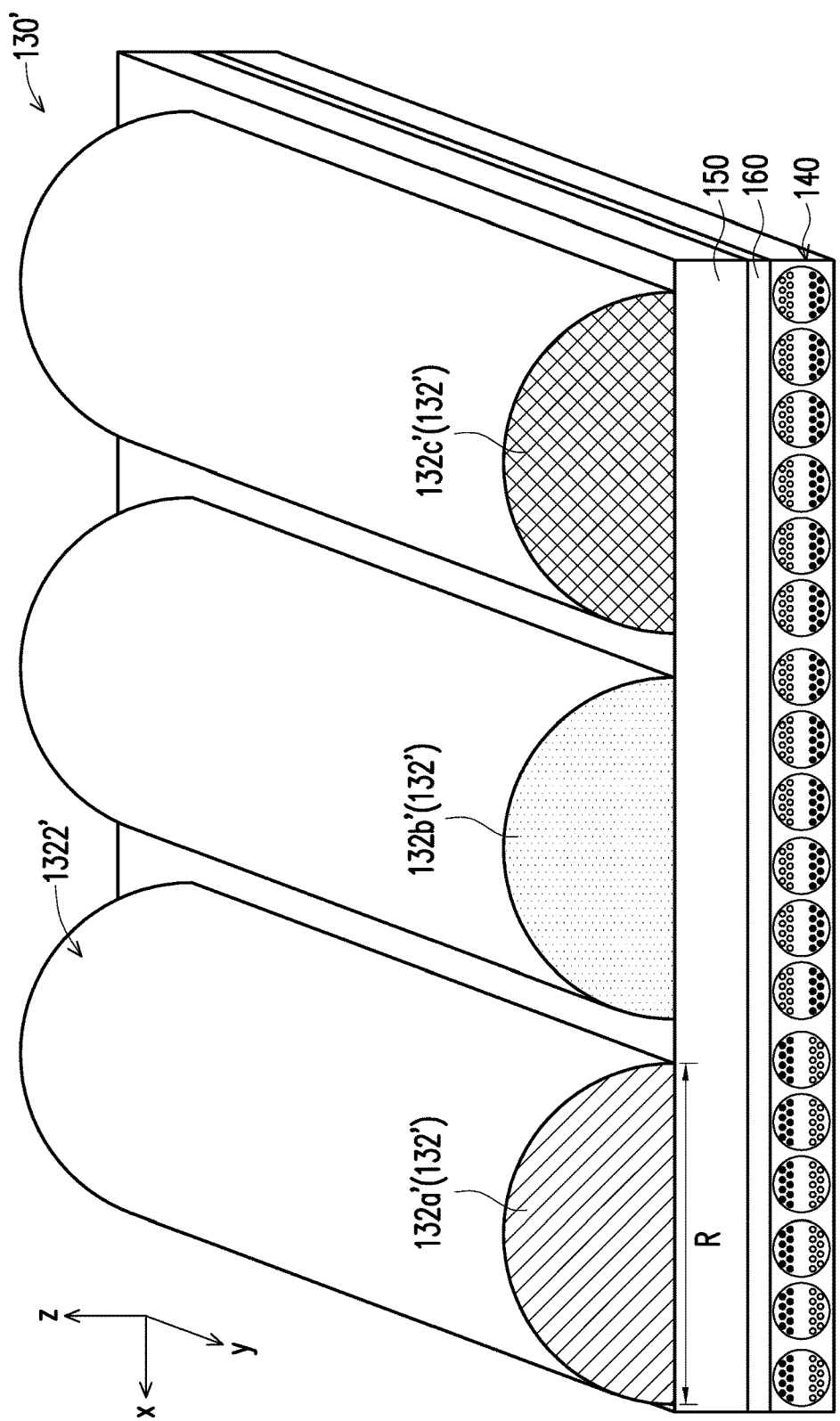
FIG. 2B is a partial schematic perspective view illustrating a color filter array, a second substrate, a transparent conductive layer and a display layer in FIG. 2A.

FIG. 2A is a schematic cross-sectional view illustrating an display apparatus according to another embodiment of the invention. FIG. 2B is a partial schematic perspective view illustrating a color filter array, a second substrate, a transparent conductive layer and a display layer in FIG. 2A. Referring to FIG. 2A and FIG. 2B, the display apparatus 100' of the present embodiment is similar to the display apparatus 100 shown in FIG. 1A, and the differences therebetween are illustrated as follows. In the display apparatus 100' of the embodiment, the filter units 132' are in cylindrical lenticular shapes, and the filter units 132' are configured to guide lights from the different sub-pixel sub-structures 210 of the same sub-pixel structure 200 toward different directions, such that the display apparatus 100' displays a three-dimensional image. That is, the filter units 132' in cylindrical lenticular shapes are formed (e.g. printed or coated) on the second substrate 150 to replace the image divider 180 attached at the top of the display apparatus. In the embodiment, each of the filter units 132' may extend in a first direction (e.g., the y direction), and the filter units 132' may be arranged in a second direction (e.g., the x direction), as shown in FIG. 2B. In other words, in the embodiment, the upper surfaces 1322' of the filter units 132' may curve in the x direction, and do not curve in the y direction. In addition, for example, the filter units 132a', 132b' and 132c' are red filter units, green filter units and blue filter units, respectively, and the materials are red photoresist, green photoresist and blue photoresist, but the disclosure is not limited thereto. The filter units 132a', 132b' and 132c' may also be the filter units having other different colors according to actual requirement.

In the embodiment, the display apparatus 100' further includes a passivation layer 410 covering the filter units 123', so as to protect the filter units 132'. The material of the passivation layer 410 may be any kinds of transparent materials, for example, glass or polymers, wherein the polymers may be polymethylmethacrylate (PMMA), polycarbonate (PC), or any other suitable polymer materials.

In the embodiment, each of the filter units 132' is complied with R/4<H<2R, wherein H is a height for the filter unit 132' in a direction perpendicular to the first substrate 110 (e.g., the z direction), and R is a width for the filter unit 132' in a direction parallel to the first substrate 110 (e.g., the x direction). As such, the filter units 132' which are in cylindrical lenticular shapes may achieve a good three-dimensional (3D) display effect. In this embodiment, the pitch P1 of the filter units 132' in the arrangement direction of the filter units 132a', 132b', and 132c' (e.g. the −x-direction) is substantially the same as the pitch P2 of the sub-pixel structures 200 in this arrangement direction (e.g. the −x-direction). The aforementioned "the pitch P1 is substantially the same as the pitch P2" means the absolute value of the difference between the pitch P1 and the pitch P2 is less than or equal to 10% of the pitch P2. Moreover, in this embodiment, the filter units 132' are separate from each other. However, in other embodiments, the filter units 132' may connect with each other.

In the display apparatus 100' of the embodiment, the filter units 132' which are in cylindrical lenticular shapes are used to achieve the 3D display effect, thus the image divider 180 shown in FIG. 1A may not be employed. In addition, as shown in FIG. 1A, the color filter array 130 is disposed between the second substrate 150 and the transparent conductive layer 160, however in the present embodiment, the transparent conductive layer 160 may be disposed on the lower surface of the second substrate 150, and the filter unit array 130' may be disposed on the upper surface of the second substrate 150.

Figure 3:
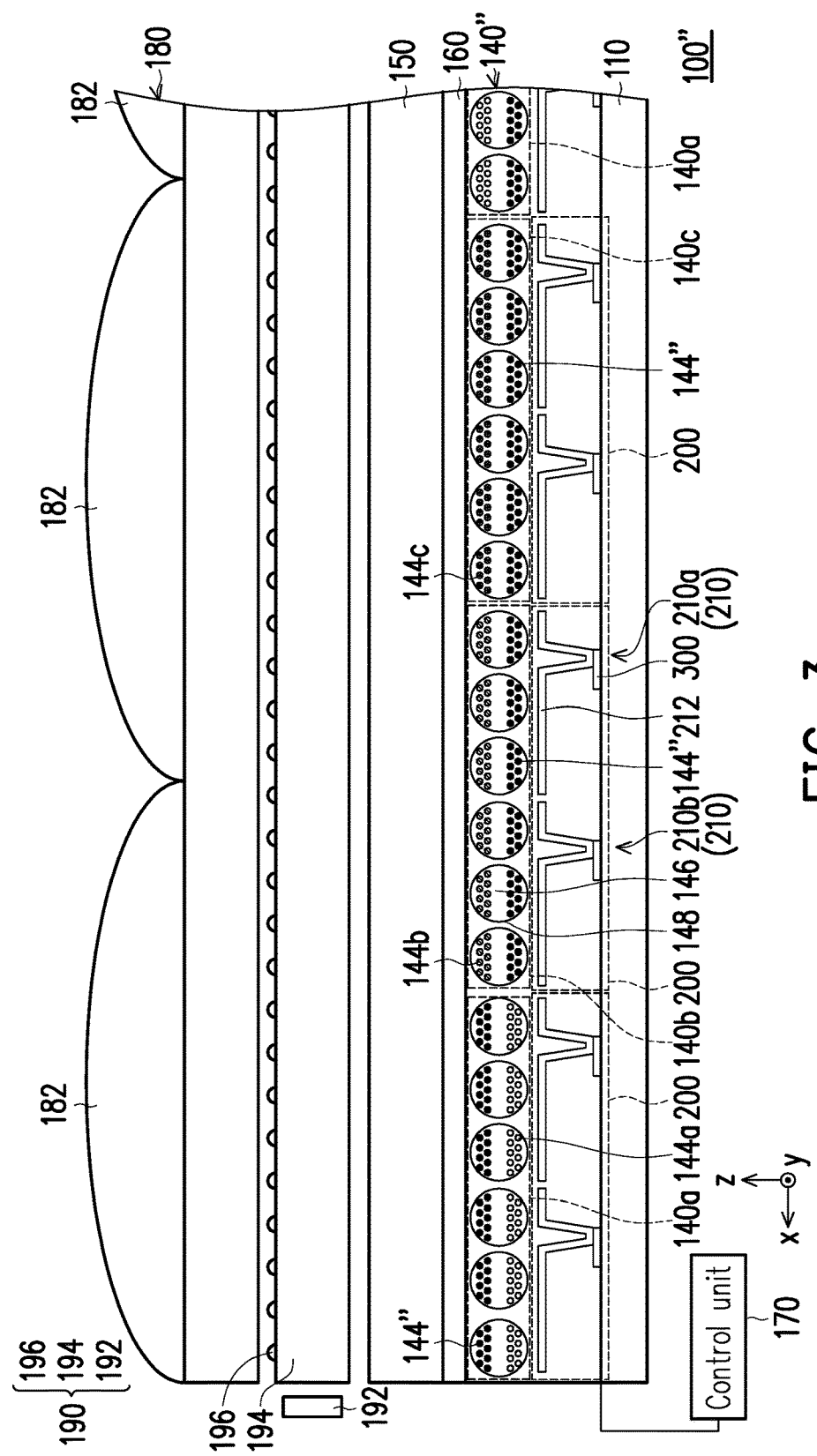
FIG. 3 is a schematic cross-sectional view illustrating a display apparatus according to another embodiment of the invention.

FIG. 3 is a schematic cross-sectional view illustrating a display apparatus according to another embodiment of the invention. Referring to FIG. 3, the display apparatus 100" of the present embodiment is similar to the display apparatus 100 shown in FIG. 1A, and the differences therebetween are illustrated as follows. In the display apparatus 100" of the embodiment, the display layer 140" is disposed above the sub-pixel structures 200, and includes a plurality of display units 140a, 140b and 140c. In this embodiment, the display units 140a, 140b and 140c are, for example, electrophoretic units. These display units 140a, 140b and 140c are divided into a plurality of groups having different colors (e.g., divided into three groups: 140a, 140b and 140c), and the display units 140a, 140b and 140c belonging to the groups having different colors are alternately disposed above the sub-pixel structures 200. Herein each of the display units 140a, 140b and 140c corresponds to the sub-pixel sub-structures 210 of at least one sub-pixel structure 200, and at least two of the sub-pixel sub-structures 210 of the same sub-pixel structure 200 are applied different voltages. In the embodiment, the colors of the electrophoretic particles 144a, 144b and 144c and 144" in the display units 140a, 140b and 140c having different colors are at least partially different. For example, the display units 140a are red display units including red electrophoretic particles 144a and black electrophoretic particles 144", the display units 140b are green display units including green electrophoretic particles 144b and black electrophoretic particles 144", and the display units 140c are blue display units including blue electrophoretic particles 144c and black electrophoretic particles 144".

In the embodiment, by using the display units 140a, 140b and 140c having different colors, the display apparatus 100" may not use the color filter array 130 shown in FIG. 1A.

Figure 4:
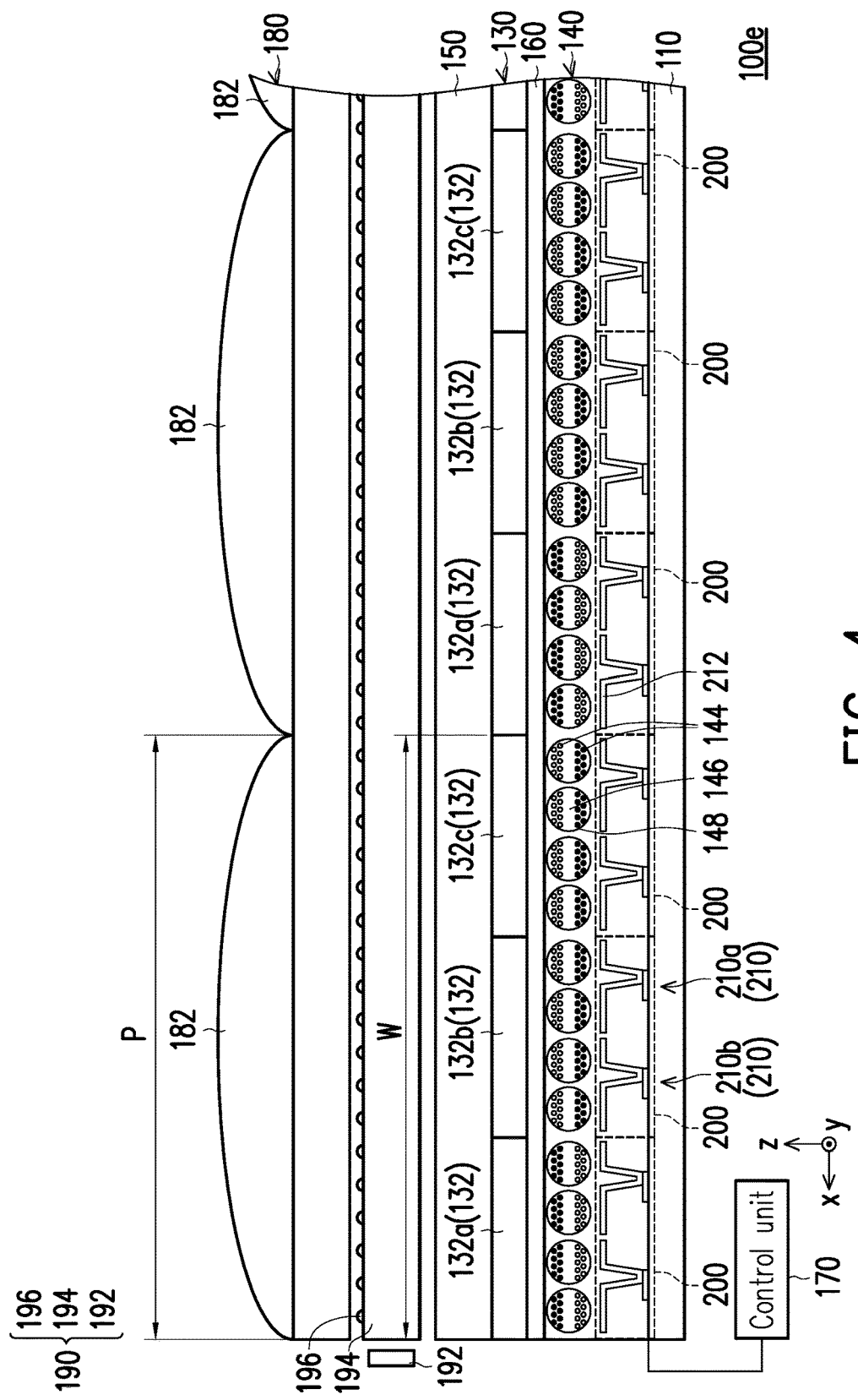
FIG. 4 is a schematic cross-sectional view illustrating a display apparatus according to another embodiment of the invention.

FIG. 4 is a schematic cross-sectional view illustrating a display apparatus according to another embodiment of the invention. Referring to FIG. 4, the display apparatus 100e in this embodiment is similar to the display apparatus 100 in FIG. 1A, and the main difference therebetween is as follows. In this embodiment, a pitch P of the lenticulars 182 in the arrangement direction of the filter units 132a, 132b, and 132c (e.g. the −x-direction) is substantially the same as a total width W of filter units 132a, 132b, and 132c having different colors in a single color alternating period. The aforementioned "the pitch P is substantially the same as the total width W" means the absolute value of the difference between the pitch P and the total width W is less than or equal to 10% of the total width W.

Figure 5:
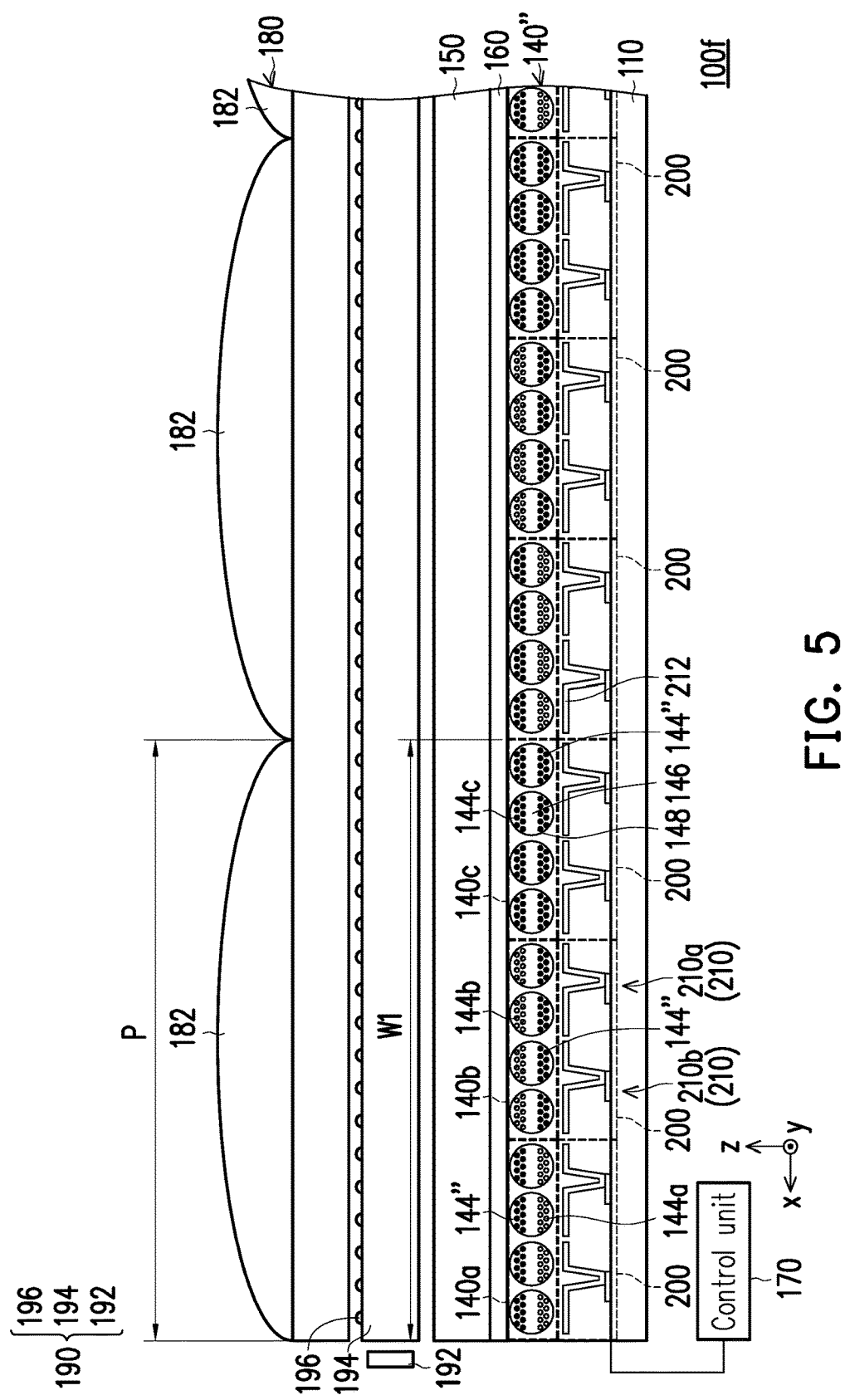
FIG. 5 is a schematic cross-sectional view illustrating a display apparatus according to another embodiment of the invention.

FIG. 5 is a schematic cross-sectional view illustrating a display apparatus according to another embodiment of the invention. Referring to FIG. 5, the display apparatus 100f in this embodiment is similar to the display apparatus 100" in FIG. 3, and the main difference therebetween is as follows. In this embodiment, a pitch P of the lenticulars 182 in the arrangement direction of the filter units 132a, 132b, and 132c (e.g. the −x-direction) is substantially the same as a total width W1 of display units 140a, 140b and 140c having different colors in a single color alternating period. The aforementioned "the pitch P is substantially the same as the total width W1" means the absolute value of the difference between the pitch P and the total width W1 is less than or equal to 10% of the total width W1. The image divider 180 is configured for guiding lights from the different sub-pixel sub-structures 210 of the same sub-pixel structure 200 toward different directions, such that the display apparatus 100f displays a three-dimensional (3D) image.

In summary, in the display apparatus of the embodiments of the invention, due to that at least one sub-pixel structure in correspondence with a filter unit or a display unit is divided into a plurality of sub-pixel sub-structures, the sub-pixel sub-structures may be configured for displaying images in different color levels or of different view angles so as to enhance a three-dimensional sense of an image displayed by the display apparatus, or form a three-dimensional (3D) image rich in content.

Although the invention has been disclosed with reference to the aforesaid embodiments, they are not intended to limit the invention. It will be apparent to those skilled in the art that various modifications and variations can be made to the structure of the disclosed embodiments without departing from the scope or spirit of the invention. In view of the foregoing, it is intended that the disclosure cover modifications and variations of the specification provided they fall within the scope of the following claims and their equivalents.

What is claimed is:

1. A display apparatus, comprising:
   a first substrate;
   a plurality of sub-pixel structures disposed on the first substrate, each of sub-pixel structures comprising at least two sub-pixel sub-structures;
   an display layer disposed above the sub-pixel structures, and comprising a plurality of display units, the display units being divided into a plurality of groups having different colors and the display units belonging to the groups having different colors alternately being disposed above the sub-pixel structures along an arrangement direction, wherein each of the display units corresponds to the at least two sub-pixel sub-structures of at least one sub-pixel structure, and the at least two sub-pixel sub-structures of the same sub-pixel structure are applied different voltages; and
   an image divider disposed above the display layer, and configured to guide lights from the different sub-pixel sub-structures of the same sub-pixel structure toward different directions, such that the display apparatus displays a three-dimensional image, wherein the image divider is a lenticular film comprising a plurality of lenticulars arranged along the arrangement direction,
   wherein a pitch of the lenticulars in the arrangement direction is substantially the same as a total width of display units having different colors in a single color alternating period.

2. The display apparatus as claimed in claim 1, further comprising a control unit electrically connected to the sub-pixel sub-structures, and configured for the different sub-pixel sub-structures of the sub-pixel structures to be driven respectively to voltages corresponding to images of different view angles, such that the display apparatus displays the three-dimensional image.

3. The display apparatus as claimed in claim 1, wherein each of the sub-pixel sub-structures comprises:
 a transistor; and
 a pixel electrode electrically connected to the transistor.

4. The display apparatus as claimed in claim 1, wherein the display layer comprises:
 a plurality of capsules;
 a plurality of electrophoretic particles disposed in the capsules; and
 a medium filled in the capsules, wherein colors of the electrophoretic particles in the display units having different colors are at least partially different.

* * * * *